May 2, 1939.    C. S. KNOWLTON    2,156,630
TIMING CIRCUITS
Filed Feb. 19, 1938
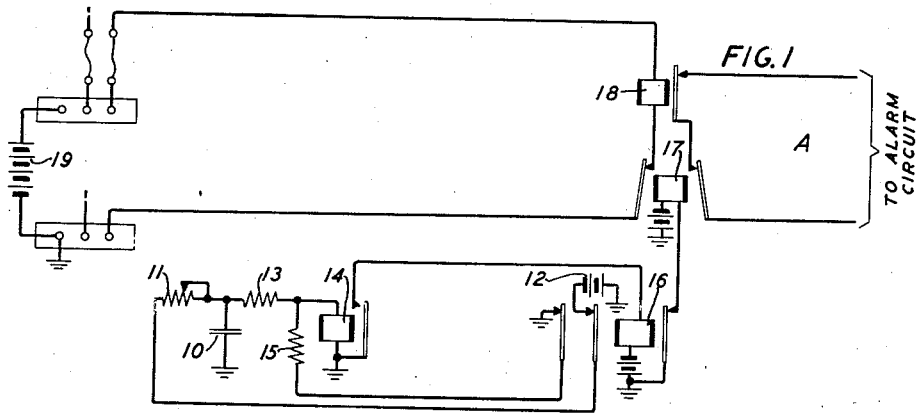
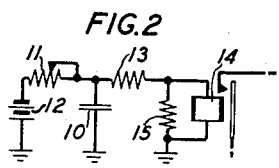
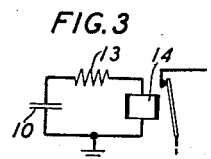
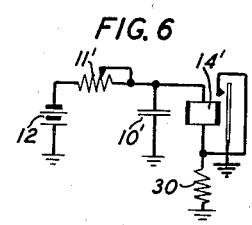
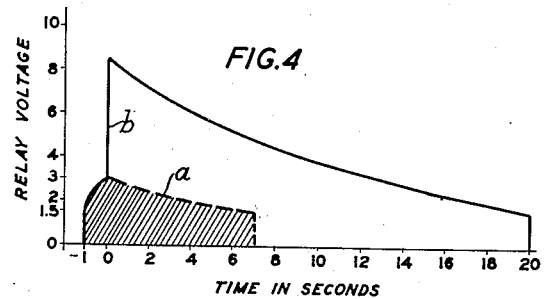
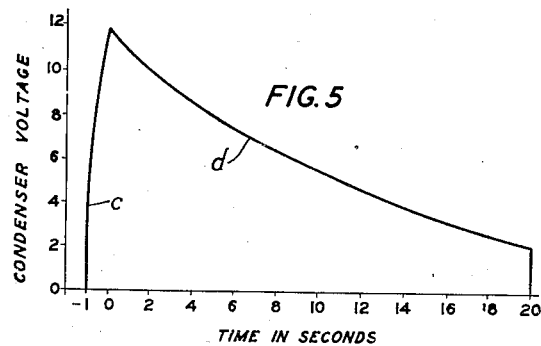
INVENTOR
C. S. KNOWLTON
BY
ATTORNEY Patented May 2, 1939

2,156,630

UNITED STATES PATENT OFFICE 2,156,630

TIMING CIRCUITS

Clarence S. Knowlton, Springfield, N. J., assignor to Bell Telephone Laboratories, Incorporated, New York, N. Y., a corporation of New York Application February 19, 1938, Serial No. 191,411

8 Claims. (Cl. 175—320)

This invention relates generally to electric circuits and particularly to timing circuits which include means for automatically charging and discharging a condenser in indefinitely repeated cycles and in which a translating device is subjected to the condenser discharge current.

In numerous instances in electric power and telephone plants it is necessary to run periodic tests to insure proper functioning of the equipment located therein. In the telephone plant, for example, it has been common practice to connect alarm circuits across a tripping battery supply to insure continuity of service. In small plants of this nature wherein dry cells or batteries have been employed for the tripping supply and wherein the alarm circuit has been continuously connected to the battery supply, it has been found that the alarm circuit drain has usually been several times greater than the actual circuit load supplied by the battery. In large plants it has been found practical to employ expensive and rather complicated timing arrangements for connecting the alarm circuits to the battery supply periodically, thereby reducing the drain on the battery caused by the alarm circuit load. The use of such timing arrangements in the smaller plants, however, is not considered practical.

It is the object of this invention, therefore, to provide a simple, inexpensive and practical timing circuit which will find practical application in telephone plants of small capacity.

This object is attained in accordance with a feature of the invention by incorporating means in the condenser discharge circuit of a condenser timing arrangement which serves, during the charging cycle, to permit the condenser to charge to a value considerably in excess of that required to operate a translating device or relay included in the discharge circuit and which, immediately upon the operation of the translating device, is removed from the discharge circuit to prolong the operate period of the relay.

In accordance with the preferred form of the invention a resistance is included in the discharge circuit in shunt with the winding of the translating device during the charging cycle and is automatically removed when the translating device operates so that the condenser discharges through the winding of the device exclusive of the shunt resistance.

In a second form of the invention a resistance is included in series with the winding of the translating device and is removed when the translating device operates.

The invention will be readily understood from the following detailed description made with reference to the accompanying drawing in which:

Fig. 1 is a schematic representation of the timing circuit of this invention used to control the periodic association of a test relay to the terminals of a supply battery;

Fig. 2 is a circuit schematic of the timing arrangement and illustrates the condition which prevails during the condenser charging cycle;

Fig. 3 illustrates schematically the circuit condition which prevails during the condenser discharge cycle;

Figs. 4 and 5 are voltage-time curves, the first illustrating the gain in time effected by the use of applicant's invention as shown in Figs. 1 to 3 inclusive, over commonly employed condenser timing circuits;

Figs. 6 and 7 correspond to Figs. 2 and 3 and illustrate the conditions which prevail during the charge and discharge cycles respectively in the second embodiment of applicant's invention.

With particular reference to the lower portion of Fig. 1 and to Figs. 2 and 3 a condenser 10 is shown with one plate connected to ground and the other plate to the ungrounded terminal of battery 12 by way of a current limiting resistance 11. These elements constitute the charging circuit for the condenser and the charging time may be adjusted to any suitable value by varying the position of the pointer associated with resistance 11.

As illustrated, the discharge circuit includes resistance 13, the winding of relay 14 and the resistance 15 which is connected in shunt with the winding of relay 14 to ground at the outer left-hand armature and back contact of relay 16. Under this condition, which is illustrated in Fig. 2, relay 14 is unoperated as is also relay 16 whose energization is controlled by the front contact and armature of relay 14. The condenser 10 accordingly charges to a voltage considerably in excess of that required to effect the operation of relay 14 (as will be described in detail later) and to such a value that the resulting voltage across the network, which includes resistance 15 and the winding of relay 14, is sufficient to cause relay 14 to operate. Relay 14 operated, establishes an obvious energizing circuit for relay 16 which relay immediately operates and attracts its three armatures. At its outer left-hand armature and back contact relay 16 opens the circuit of the shunt resistance 15 so that the full condenser voltage is connected across the resistance 13 and the winding of relay 14. The operate interval of relay 14 is, therefore, determined by the time required for the energy stored in condenser 10 to be dissipated through the winding of relay 14 and resistance 13 in series. The relay 14 will, therefore, remain operated until such time when the condenser discharge current reaches that value at which relay 14 releases.

At its inner left-hand armature and back contact relay 16 opens the charging circuit to condenser 10 and at its right-hand armature and back contact opens the circuit to relay 17 which releases its armatures. Fig. 3 illustrates the condition of the timing circuit which prevails when relay 16 is operated. In order to show a practical application of the invention relay 17 is illustrated as controlling, at its left-hand armature and front contact, the circuit of a test relay 18 and, at its right-hand armature and front contact, an alarm circuit. It follows from the description so far advanced, that during the operate interval of relay 14, the relay 18 is disconnected from the terminals of battery 19 which may, in practice, be used to supply power to various power consuming devices. The alarm circuit A is also open during this interval.

When the condenser voltage has fallen to a value at which relay 14 releases, the circuit for relay 16 is again opened whereupon the resistance 15 is again connected in shunt with the winding of relay 14, the charging circuit to condenser 10 is reestablished and the circuit to relay 17 completed. Relay 17 accordingly operates and at its left-hand armature and front contact connects the winding of relay 18 across the terminals of battery 19 and at its right-hand armature and front contact completes the alarm circuit to the armature of relay 18. If the voltage of battery 19 is up to requirements, relay 18 operates to open the alarm circuit A and prevent the transmission of an alarm signal. Should the voltage of battery 19 be below requirements relay 18 would fail to operate and the alarm circuit A would be completed at the right-hand armature and front contact of relay 17.

When relay 16 releases as just described, the condenser 10 again charges from the source 12 through the current limiting resistance 11 and the cycle of operations is repeated indefinitely.

From the foregoing description it is apparent that the test relay 18 is connected to the terminals of battery 19 only during the release interval of relay 14, that is, during the charging cycle of condenser 10, and disconnected therefrom during the operate interval of relay 14.

In order that a clearer understanding of the invention may be had, the following description includes a computation of the condenser voltage which is attained under a condition in which the following resistance values prevail; resistance 13, 2000 ohms; resistance 15, 790 ohms and the resistance of the winding of relay 14, 5000 ohms. In this discussion it will be assumed that the relay 14 requires 3 volts to operate it and will release on 1½ volts. By computation the shunt resistances 790 ohms and 5000 ohms have a single equivalent resistance of $$\frac{790 \times 5000}{790 + 5000}$$

in accordance with the well-known formula involving parallel resistances. This equivalent resistance is approximately 682 ohms. The condenser 10 is accordingly connected across resistance 13 (2000 ohms) and the equivalent resistance 682 ohms just computed. If the voltage across the network including resistance 15 and the winding of relay 14 which results in the operation of relay 14 is, as assumed, 3 volts, and this voltage is effected by the resistance 682 ohms, it follows that the voltage X across the resistance 13 at that time will be in accordance with the proportion $2000:X=682:3$. Solving this equation it is found that the voltage across resistance 13 is approximately 8.8 volts. Accordingly, the condenser voltage is equal to the sum of 8.8 volts and 3 volts or 11.8 volts. The condenser 10 will, therefore, be charged to a voltage of 11.8 volts before relay 14 operates, at which time the voltage across the relay is 3 volts. Now when relay 14 operates and causes relay 16 to operate, the shunt resistance 15 is removed from the discharge circuit and a greater portion of the energy stored in the condenser at 11.8 volts will now be dissipated through the winding of relay 14 and as illustrated by the curves of Figs. 4 and 5 the time consumed for this dissipation until the condenser voltage has dropped to a value equal to the release voltage of the relay is approximately 20 seconds. Relay 14 accordingly is held operated, under the conditions just assumed, for 20 seconds and is released for approximately 1 second, equivalent to the time it takes for the condenser to charge to a voltage of 11.8 volts. It is quite apparent, therefore, that the condenser 10 is permitted to charge to a value considerably in excess of that required to operate the relay 14 directly, that is, without the network comprising resistances 13 and 15. It is quite obvious that without resistances 13 and 15 the condenser 10 would charge up to three volts, or the operating voltage of the relay, and then discharge through the relay winding.

It will be noted that the curves shown in Figs. 4 and 5 illustrate graphically the conditions which prevail in the case of the assumed resistance values described above. With reference to Fig. 4 it will be noted that the relay voltage starts to build up from 1.5 volts and in one second's time reaches a voltage of three volts, the voltage required to operate the relay 14. Without resistances 13 and 15 in the discharge circuit, relay 14 would immediately operate, the voltage across its winding gradually diminishing in accordance with the curve $a$ until it reaches a value of 1½ volts at which voltage the relay releases. As illustrated by curve $a$ of Fig. 4 the time consumed during this drop in voltage is about 7 seconds.

With resistances 13 and 15 included in the discharge circuit it was found that relay 14 would not operate until the condenser 10 was charged to a potential of 11.8 volts. The charge and discharge curves for the condenser 10 are shown at $c$ and $d$ in Fig. 5. It was also illustrated that when the condenser 10 was charged to a potential of 11.8 volts the same voltage appeared across the network including resistances 13 and 15 and the winding of relay 14 and that this voltage was divided in the proportion of 8.3 volts across resistance 13 and 3 volts across the parallel resistances 15 and winding of relay 14. Relay 14 accordingly, operates and causes the immediate removal of resistance 15 from the discharge circuit with the result that a potential of 11.8 volts, or the potential to which the condenser 10 is charged, is connected across the 2000 ohm resistance 13 and the winding of relay 14 which has a resistance of 5000 ohms. It follows, therefore, that at the time relay 14 operates a potential is applied to its winding which is equal to five-sevenths of 11.8 volts or 8.4 volts. The voltage across relay 14 is, therefore, in the case chosen for descriptive purposes, increased from 3 volts without resistances 13 and 15 to 8.4 volts, an increase of 5.4 volts which is shown by the vertical line b in Fig. 4. Obviously, relay 14 will remain operated for a considerably longer period of time, and as illustrated by Fig. 4, this gain in time amounts to 13 seconds, or the difference between 7 seconds and 20 seconds.

In the modification diagrammatically represented by Figs. 6 and 7, substantially the same results are obtained, that is, a gain of time in the operate interval of the relay is effected. In this arrangement a resistance 30 is connected in series with the winding of relay 14' in the condenser discharge circuit. As in the previous discussion it will be assumed for descriptive purposes only, that the winding of relay 14' has a resistance of 5000 ohms and that resistance 30 is also 5000 ohms. It will also be assumed, as in the previous case, that relay 14' will operate when a voltage of 3 volts is connected across its terminals and will release on 1½ volts. It is apparent, therefore, that in order to effect the operation of relay 14' the condenser 10' must be charged to a potential of 6 volts. Then when the relay operates to disconnect the resistance 30 from the discharge circuit (this condition is illustrated by Fig. 7), the entire condenser voltage of 6 volts is applied to the winding of the relay so that the time relay 14' remains operated is equivalent to the time it takes for the condenser 10' to discharge from a potential of 6 volts to a potential of 1½ volts, the release voltage of the relay. With the resistance 30 omitted from the circuit the condenser 10' would charge to a potential of only 3 volts, the operating voltage of the relay 14' and the interval during which the relay remains operated would be equal to the time it takes for the condenser 10' to discharge from a potential of 3 volts to a potential of 1½ volts, the release voltage of the relay. Obviously, a very material gain in the operate interval of the relay is obtained.

The timing circuits illustrated have a further advantage in that the charging time for the condenser may be varied by altering the value of resistance 11 without affecting the discharge time, though any variations in the resistance values in the discharge circuit would be reflected in the charging time.

From the foregoing descriptions it is apparent that applicant has devised a simple, economical and flexible condenser timing circuit in which means included in the condenser discharge circuit during the charge cycle and automatically removed during the discharge cycle serves to increase the condenser voltage to a value considerably in excess of that required to operate a translating device included in the discharge circuit and to materially prolong the operate interval thereof.

What is claimed is:

1. In an electric timing circuit, a condenser, a charging circuit for said condenser, a discharge circuit for said condenser including a relay and a resistance normally connected in circuit relation with the winding of said relay and means controlled by said relay for opening the circuit to said resistance.

2. In an electric timing circuit, a condenser, a charging circuit for said condenser, a discharge circuit for said condenser of predetermined resistance normally consisting of a resistance network including the winding of a relay and means controlled by said relay for altering the resistance of said discharge circuit.

3. In an electric timing circuit, a condenser, a charging circuit for said condenser including means for charging said condenser to a particular voltage, a discharge circuit for said condenser including the winding of a relay, means included in said discharge circuit for causing the application of a portion of said particular condenser voltage to said relay winding and means controlled by said relay for causing an increased proportion of said particular condenser voltage to be applied to said relay winding.

4. In an electric timing circuit, a condenser, a charging circuit for said condenser including a source of direct current, a discharge circuit for said condenser including a relay which operates at a predetermined voltage, means included in said discharge circuit for causing said condenser to charge from said source to a voltage in excess of the predetermined relay voltage and means controlled by said relay for removing said first-mentioned means from said discharge circuit.

5. In an electric timing circuit, a condenser, a charging circuit for said condenser including a source of direct current, a discharge circuit for said condenser including a relay which operates when a predetermined voltage is applied to its winding, means included in said discharge circuit for causing said condenser to be charged from said source to a voltage in excess of the predetermined relay voltage before said predetermined relay voltage is applied to said relay and means controlled by said relay for removing said first-mentioned means from said discharge circuit whereupon a condenser voltage in excess of the predetermined relay voltage is applied to said relay.

6. In combination, a source of direct current, a condenser, a charging circuit for said condenser including said source of direct current, a discharge circuit for said condenser including the winding of a relay and a resistance connected in shunt therewith and means controlled by said relay when operated for causing said resistance to be excluded from said discharge circuit.

7. In combination, a source of direct current, a condenser, a charging circuit for said condenser including said source of direct current, a discharge circuit for said condenser including the winding of a relay and a resistance connected in shunt therewith and means controlled by said relay when operated for causing said resistance to be excluded from said discharge circuit, and for opening said charging circuit.

8. In combination, a source of direct current, a condenser, a charging circuit for said condenser including said source of direct current, a discharge circuit for said condenser including the winding of a relay and a serially connected resistance and means controlled by said relay when operated for removing said resistance from said discharge circuit.

CLARENCE S. KNOWLTON.